Jan. 16, 1934.　　　C. A. BREWER ET AL　　　1,943,296
BRAKE CONTROL
Filed Dec. 20, 1928　　　2 Sheets-Sheet 1
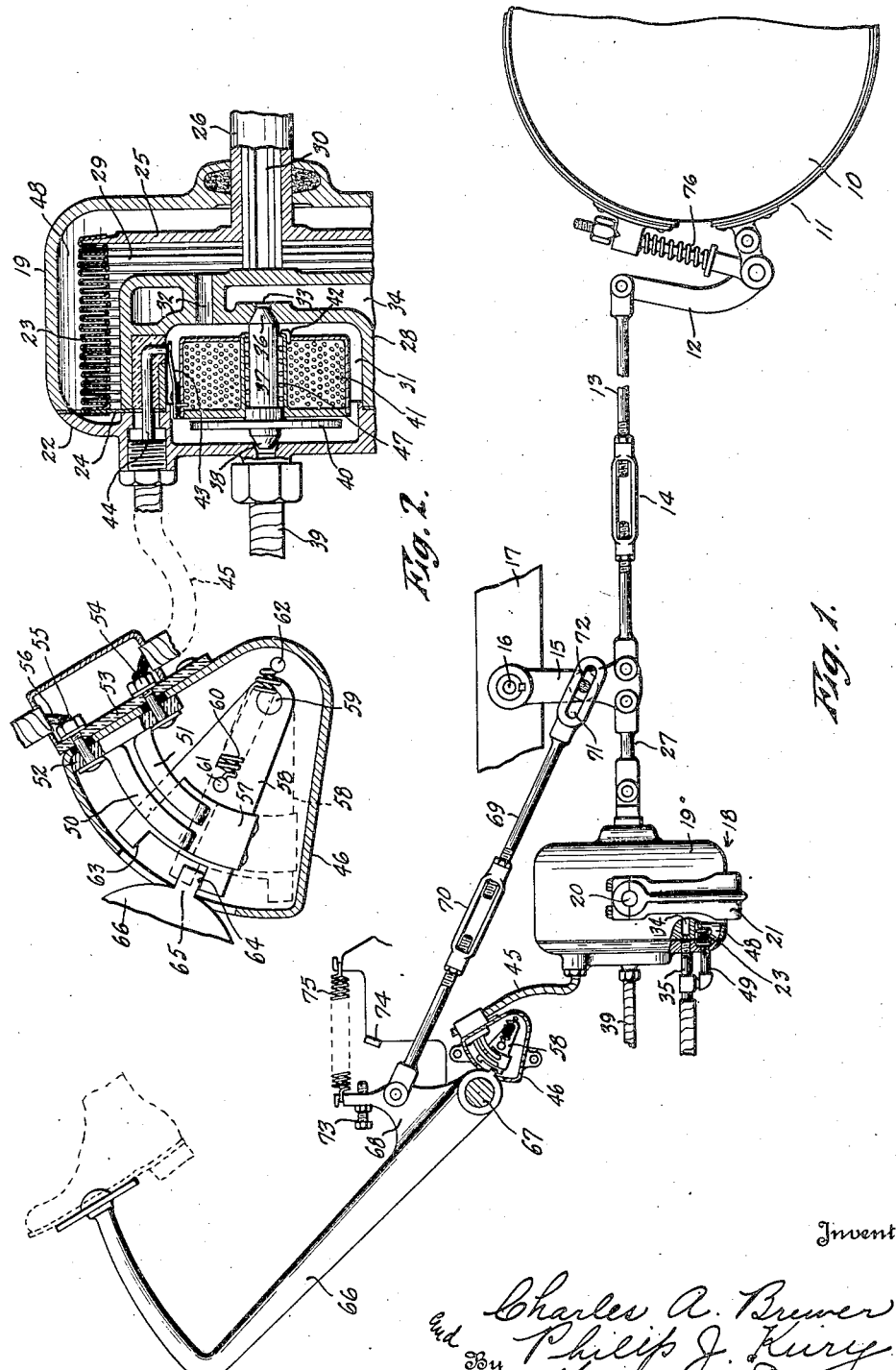
Inventors
Charles A. Brewer
and Philip J. Kury
By Wooster & Davis
Attorneys Patented Jan. 16, 1934

1,943,296

UNITED STATES PATENT OFFICE 1,943,296

BRAKE CONTROL

Charles A. Brewer, Noroton Heights, and Philip J. Kury, Arverne, N. Y.

Application December 20, 1928. Serial No. 327,402

2 Claims. (Cl. 188—152)

This invention relates to a brake controlling device for motor vehicles, and has for an object to provide a mechanism in which the brakes may be applied with a minimum of effort on the part of the operator.

It is also an object of the invention to provide a brake control mechanism in which there is a power device for applying a brake under normal operation and which power device is controlled by the usual brake lever, and also in which the lever may be used to assist the power device for emergency operation, or may be used to apply the brake independently of the power device.

With the foregoing and other objects in view, the invention consists in certain novel features of construction, combinations and arrangements of parts as will be more fully disclosed in connection with the accompanying drawings. In these drawings, Fig. 1 is a side elevation of one form of our improved brake control mechanism.

Fig. 2 is a detail section of the power device and control means therefor.

Figure 3:
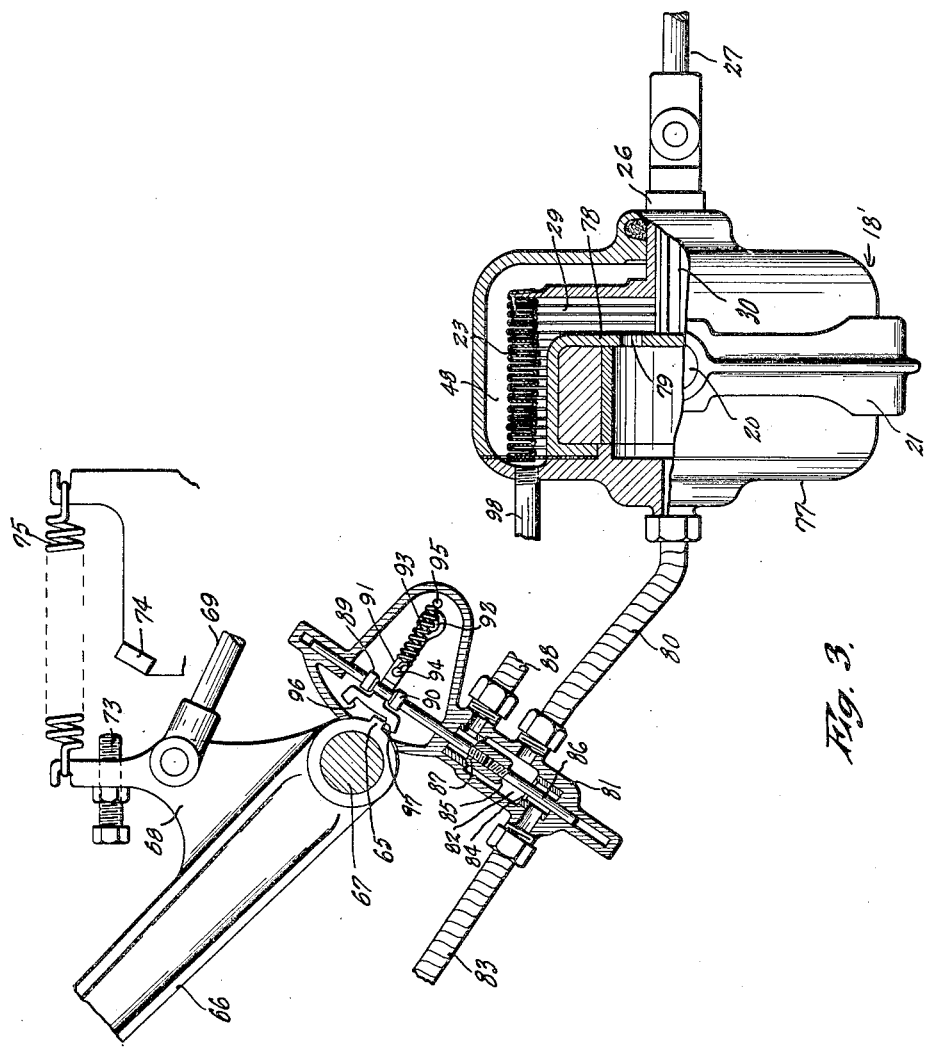
Fig. 3 is a partial side elevation and partial section of portions of the control mechanism showing a slightly different construction of power device, and control means therefor.

Referring to Figs. 1 and 2 a brake drum is shown at 10 and any suitable type of brake 11 operated by a lever 12 connected to a suitable rodding or linkage 13 which may include a turn buckle 14 for adjustment. This rodding or linkage is connected to an arm 15 pivoted at 16 on the frame 17 of the vehicle. This arm is operated under normal operation by the power device 18 which may be of any suitable type, but the preferred construction is shown in Fig. 2. This device as shown is operated by suction from any suitable source as the intake manifold of the engine. As illustrated it comprises a casing 19 mounted by suitable trunnions 20 in the bracket 21 secured to any suitable part of the vehicle, such as the frame 17. This casing or housing includes a cap 22 which is separable from the body of the casing to permit access to the interior thereof and closes one open end of the body portion of the casing. Within the casing is any suitable type of diaphragm 23, that shown, being a bellows type of flexible diaphragm secured at one end to the cap 22 as by the disc 24. At its opposite end the diaphragm carries a plate 25 which has a tubular extension 26 projecting from one end of the housing or casing and is connected by a link 27 with the arm 15.

The cap 22 has an extension 28 projecting into the space 29 within the diaphragm so as to reduce the amount of air held by this space and it carries a stud 30 in the tube 26 to assist in guiding it. The extension 28 has a chamber 31 communicating with the space 29 by a passage 32 and also communicates through a passage 33 with a space 34 connected by a pipe 35 with the atmosphere, and it is preferred to lead this pipe to a position within the car so as to reduce entrance of dust and dirt. The passage 33 is controlled by a valve 36 carried by a rod 37, and at its opposite end this rod carries a valve 38 controlling the passage from the chamber 31 to a suction pipe 39 leading to any suitable source of suction such as the intake manifold of a motor. The valves 38—36 are so arranged that when one is closed the other is open. The rod 37 carries a plate 40 which with the rod forms an armature for the coil 41 surrounding the rod, one end of which is grounded at 42 and the other end of which is connected by a contact 43 with a conductor 44 in a conduit 45 leading to the control switch. Enclosed in the coil 41 a spring 47 about the armature rod 37 tends to move rod 37 to the left to close the valve 38 and open the valve 36 while the solenoid when energized tends to shift it in the opposite direction to close the valve 36 and open the valve 38. The space 48 outside the diaphram 23 also communicates with the atmosphere through the pipe 49.

The control switch is enclosed in the casing 46 secured to any suitable part of the car, and mounted in this casing are two arc shaped space spring contacts 50 and 51. These contacts are insulated from the casing by the insulating members 52 and 53, and the contact 51 is connected by the bolt 54 with the conductor in the conduit 45 while the contact 50 is connected by a bolt 55 connected to a conduit 56 leading to any suitable source of current, such as a battery or generator. Mounted within the casing 46 is a movable switch contact 57 which is mounted on any suitable movable support 58. This support may be of insulating material or the contact 57 may be insulated from it, and in the form shown is pivoted in the casing at 59. A spring 60 is connected at one end 61 to the support 58 and at its opposite end 62 to the casing and is so arranged that as the support 58 is oscillated about its pivot 59 the axis of this spring will pass through the axis of its pivot, thus giving a snap action for the switch to give a quick make and break and also retaining it in the "off" or "on" position. The switch is shown in full lines in the "on" position and in dotted lines in the "off"

position, it being understood that when the switch is in the "on" position or closed the contact 57 bridges the contacts 50 and 51 and closes the circuit, and that when the switch is in the "off" position the contact 57 is separated from the contacts 50—51. The support 58 has spaced shoulders 63 and 64 which cooperate with the lug 65 on the foot pedal or lever 66 so that when this lever is operated the lug 65 will engage either one of the shoulders 63—64, swinging the support 58 in opposite directions to open or close the switch.

The pedal 66 is pivoted at 67 and has an arm 68 connected by a link 69 with the lever 15, and this link 69 may include a turn buckle 70 for adjusting the link. The link has an elongated slot 71 in which the bolt 72 on the arm 15 extends thus providing a lost motion connection between the lever 66 and the arm 15. An adjustable stop 73 on the lever is adapted to engage a stationary stop 74 to limit upward movements of the lever and the spring 75 tends to hold it in this upper position.

In operation the brake is normally released and the lever 66 is held in the extreme upper position. In this normal operation with the brake released the valve 38 is closed and the valve 36 is open. This equalizes the pressure on opposite sides of the diaphragm 23 as both chambers 29 and 48 on opposite sides thereof are in communication with the atmosphere. This permits the diaphragm to expand and the spring 76 or any other springs on the brake mechanism to release the brake. Also in this position the pin 72 is spaced from the right hand or outer end of the slot 71 so that first movements of the lever 66 will not apply any force to the arm 15. If now the operator wishes to apply the brake to stop the car with normal operation he presses down the lever 66 a short distance. As lug 65 presses against the shoulder 63 it forces it upward moving the support 58 to carry the axis of spring 60 upwardly across the center of the pivot 59. This support 58 is then snapped into the position of Fig. 2 closing the switch and energizing the solenoid 41. This shifts the rod 37 to the right closing the valve 36 and opening the valve 38. This places the space 29 within the diaphragm in communication with the suction causing the pressure within this space 29 to be reduced so that atmospheric pressure within the space 48 outside the diaphragm forces the plate 25 inwardly or to the left, and by swinging arm 15 to the left pulls on the linkage 13 to apply the brake. The power device is so designed as not to have sufficient power to lock the wheels, but is sufficient to apply the brakes to stop the car in ordinary operation. If an emergency application of the brakes is desired the operator presses still further downwardly on the lever 66 bringing the end of the slot 71 into engagement with the bolt 72, and therefore, imparting direct pull from the lever 66 to the brake. It will thus be seen that in normal operation only a very slight pressure on the brake pedal is required to apply the brakes to stop the car, this being merely sufficient to operate the switch 57, but that emergency application of the brakes may be secured by pressing further on the brake pedal. If the power device 18 fails to function the brakes may be applied with the foot lever 66 the same as in any standard type of brake mechanism. After application of the brakes by the power device if the pressure is removed from the lever 66 it is brought back to its upper position by spring 75. During this movement lug 65 engages shoulder 64 and swings the support 58 downwardly to carry the axis of spring 60 downwardly across the center of the pivot 59. This will snap the switch 57 to the dotted line position breaking the circuit to the power device with a quick break or snap action and will thus release the rod 37 which will be swung to the left by the spring 47. This movement will close the valve 38 and shut off suction from the space 29 while it will open the valve 36 and place the space 29 within the diaphragm in communication with the atmosphere. This thus equalizes the pressures on opposite sides of the diaphragm and permits the brakes to be released.

In the form shown in Fig. 3 the same operation as far as the application of the brakes is concerned is secured as in the first form. In this form, however, instead of an electrical control for the power device this device is controlled by valves operated directly from the brake lever. In this form the power device 18' does not have the solenoid 41 and the valves 36 and 38. The cap 77 carries an extension 78 projecting into the space 29 within the diaphragm 23 and the passage 79 connects this space 29 with the conduit 80 leading to a control valve in the casing 81. This casing has a chamber 82 with which the conduit 80 communicates and the conduit 83 leading from a source of suction, such as the intake manifold of the motor, communicates with this chamber 82 through a valve seat 84 controlled by a valve 85 on a sliding rod 86. This rod also carries a valve 87 controlling communication from the chamber 82 with the atmosphere through a conduit 88 which may be led to any suitable position, such as the interior of the car to prevent entrance of dust and dirt. The rod 86 carries spaced shoulders 89 and 90 on opposite sides of the movable member 91. This member is preferably pivoted in the casing at 92 and a spring 93 connected at one end 94 to the member 91 and its opposite end 95 to the casing is so mounted that, as the member 91 is rocked on its pivot the axis of this spring passes through the center of the pivot 92 to thus give a snap action to the member 91 and the valves 85 and 87 carried by the rod 86, and the spring 93 also holds these valves in their different positions. The member 91 carries shoulders 96 and 97 on opposite sides of the lug 65 on the lever 66 and are engaged by this lug as the lever is swung on its pivot to swing the member 91 in opposite directions to operate the valves 85 and 87.

Thus when the operator wishes to apply the brakes he presses on the lever 66 as in the first form. Movement of this lever causes the lug 65 engaging shoulder 96 to swing the member 91 upwardly to carry axis of spring 93 past the center of the pivot 92. The spring, therefore, will shift the member 91 upwardly and with it the rod 86 and the valves 85 and 87. This will bring the elements to the position of Fig. 3 with the valve 87 closed and the valve 85 open. This places conduit 80 in communication with the suction in the conduit 83, or in other words it connects the suction in conduit 83 with the space 29 within the diaphragm 23. This reduces pressure in the space 29 causing atmospheric pressure 48 on the outside of the diaphragm to force the plate 25 inwardly and apply the brakes the same as in the first form, it being understood that space 48 outside the diaphragm is in communication with the atmosphere through the conduit 98. The brake lever 66 is connected to the arm 15 in this arrangement, the same as in the first form, so that there may be an emergency application of the brake by further pressure on the lever 66 the same as in the first arrangement. When pressure is removed from the lever 66 it is raised to its original position by the spring 75 causing lug 65 engaging the shoulder 97 to force member 91 in the opposite direction and carry the axis of spring 93 across the center of pivot 92. This shifts the valves 85 and 87 in the opposite direction, seating the valve 85 on the seat 84 and opening the vale 87. This shuts off communication of the suction conduit 83 with space 29 in the power device and brings this space in communication with the atmosphere through the conduit 88. This equalizes pressures on the opposite sides of the diaphragm and permits the brakes to be released. It will be apparent that this arrangement gives the same effect and operation as the first arrangement so far as the application and release of the brakes is concerned, and permits independent operation of the brakes or emergency application of the brakes by the foot lever the same as in the first arrangement.

The switch devices shown in Figures 1, 2 and 3 are also disclosed and claimed in the copending application of Charles A. Brewer Serial No. 699,809, filed November 27, 1933.

Having thus set forth the nature of our invention, what we claim is:

1. In a brake control mechanism, a brake mechanism, a foot lever having a lost motion connection to the brake for operating it, a power device operatively connected to the brake, a snap action control for said power device so that the control is either in one or the other of its extreme positions, and a lost motion connection from the lever to the snap action control so that the control is shifted on initial movement of the lever and is held in that position until the lever moves in the opposition direction.

2. In a power operated brake control mechanism including a fluid operated motor for operating the brake mechanism and a control valve for said fluid motor, means for operating said valve to either energize or deenergize said motor to apply or release a brake mechanism, said means comprising a double-acting snap switch mechanism, and further comprising a manually operated member operable to effect the operation of said snap switch to selectively operate said valve.

CHAS. A. BREWER.
PHILIP J. KURY.